(12) United States Patent
Sugiyama et al.

(10) Patent No.: US 7,912,623 B2
(45) Date of Patent: Mar. 22, 2011

(54) ENGINE CONTROL SYSTEM DESIGNED TO MANAGE SCHEDULE OF ENGINE CONTROL TASKS

(75) Inventors: Kouichi Sugiyama, Chiryu (JP); Koji Ishizuka, Aichi-ken (JP)

(73) Assignee: Denso Corporation, Kariya (JP)

( * ) Notice: Subject to any disclaimer, the term of this patent is extended or adjusted under 35 U.S.C. 154(b) by 241 days.

(21) Appl. No.: 12/235,947

(22) Filed: Sep. 23, 2008

(65) Prior Publication Data

US 2009/0082943 A1 Mar. 26, 2009

(30) Foreign Application Priority Data

Sep. 25, 2007 (JP) .................................. 2007-247398
Sep. 25, 2007 (JP) .................................. 2007-247399

(51) Int. Cl.
*F02D 41/26* (2006.01)
(52) U.S. Cl. ........................................ 701/103; 123/674
(58) Field of Classification Search ................... 701/102, 701/103; 123/674
See application file for complete search history.

(56) References Cited

U.S. PATENT DOCUMENTS

| | | | | |
|---|---|---|---|---|
| 4,307,450 A | * | 12/1981 | Carp et al. ..................... | 701/103 |
| 5,922,032 A | * | 7/1999 | Modeen et al. ................... | 701/3 |
| 6,016,460 A | * | 1/2000 | Olin et al. ..................... | 701/102 |
| 6,560,528 B1 | * | 5/2003 | Gitlin et al. ................... | 701/115 |
| 6,580,719 B1 | | 6/2003 | Soboleva et al. | |
| 6,631,394 B1 | * | 10/2003 | Ronkka et al. ................. | 718/100 |
| 6,970,780 B2 | * | 11/2005 | Smithberger et al. ......... | 701/102 |
| 6,988,030 B2 | | 1/2006 | Asano | |
| 7,027,907 B2 | * | 4/2006 | Le Gall et al. ................. | 701/105 |
| 7,130,723 B2 | * | 10/2006 | Minowa et al. ................... | 701/1 |
| 7,412,621 B2 | * | 8/2008 | Choi .............................. | 714/10 |
| 7,698,540 B2 | * | 4/2010 | Norton et al. .................. | 712/228 |
| 2005/0182552 A1 | * | 8/2005 | Smithberger et al. ......... | 701/103 |
| 2006/0167847 A1 | | 7/2006 | Bangel et al. | |

FOREIGN PATENT DOCUMENTS

| | | |
|---|---|---|
| EP | 1 327 935 A2 | 7/2003 |
| JP | 2000-509858 | 8/2000 |
| JP | 2001-236236 | 8/2001 |
| JP | 2002-366373 | 12/2002 |
| JP | 2005-155360 | 6/2005 |

OTHER PUBLICATIONS

Japanese Office Action dated Jan. 26, 2010, issued in corresponding Japanese Application No. 2007-247399, with English translation.

(Continued)

*Primary Examiner* — Erick Solis
(74) *Attorney, Agent, or Firm* — Nixon & Vanderhye P.C.

(57) ABSTRACT

An engine control system for managing a schedule of execution of engine control tasks is provided. The system works to schedule execution of the engine control tasks upon receipt of requests to initiate the engine control tasks. The system determines a sequence of execution of the engine control tasks and allocates execution times for which the engine control tasks are to be executed so as to provide chances of execution of the engine control task as evenly as possible. The system may determine required time-sharing ratios of the engine control tasks based on statuses of execution of the engine control tasks.

27 Claims, 7 Drawing Sheets

| REFERENCE TIME FRAME | | | REFERENCE TIME FRAME | | |
|---|---|---|---|---|---|
| CONTROL A | CONTROL B | C | CONTROL A | CONTROL B | C |

OTHER PUBLICATIONS

Japanese Office Action dated Oct. 6, 2009, issued in corresponding Japanese Application No. 2007-247398, with English translation.
Japanese Office Action dated Oct. 6, 2009, issued in corresponding Japanese Application No. 2007-247399, with English translation.
Office Action (pp. 1-5) dated Aug. 11, 2010 issued in corresponding Chinese Application No. 200810177827.4 with an at least partial English-language translation thereof.

* cited by examiner

| REFERENCE TIME FRAME | | REFERENCE TIME FRAME | |
|---|---|---|---|
| CONTROL A | CONTROL B | CONTROL A | CONTROL B |

| REFERENCE TIME FRAME | | | REFERENCE TIME FRAME | | |
|---|---|---|---|---|---|
| CONTROL A | CONTROL B | CONTROL C | CONTROL A | CONTROL B | CONTROL C |

FIG. 3(a)

| REFERENCE TIME FRAME || REFERENCE TIME FRAME ||
|---|---|---|---|
| CONTROL A | CONTROL B | CONTROL A | CONTROL B |

FIG. 3(b)

| REFERENCE TIME FRAME ||| REFERENCE TIME FRAME |||
|---|---|---|---|---|---|
| CONTROL A | CONTROL B | C | CONTROL A | CONTROL B | C |

FIG. 4(a)

| REFERENCE TIME FRAME || REFERENCE TIME FRAME ||
|---|---|---|---|
| CONTROL B | CONTROL A | CONTROL B | CONTROL A |

FIG. 4(b)

| REFERENCE TIME FRAME ||| REFERENCE TIME FRAME |||
|---|---|---|---|---|---|
| C | B | A | C | B | A |

FIG. 5(a)

| A | B | A | B | A | B | A | B |
|---|---|---|---|---|---|---|---|

FIG. 5(b)

| A | B | C | A | B | C | A | B |
|---|---|---|---|---|---|---|---|

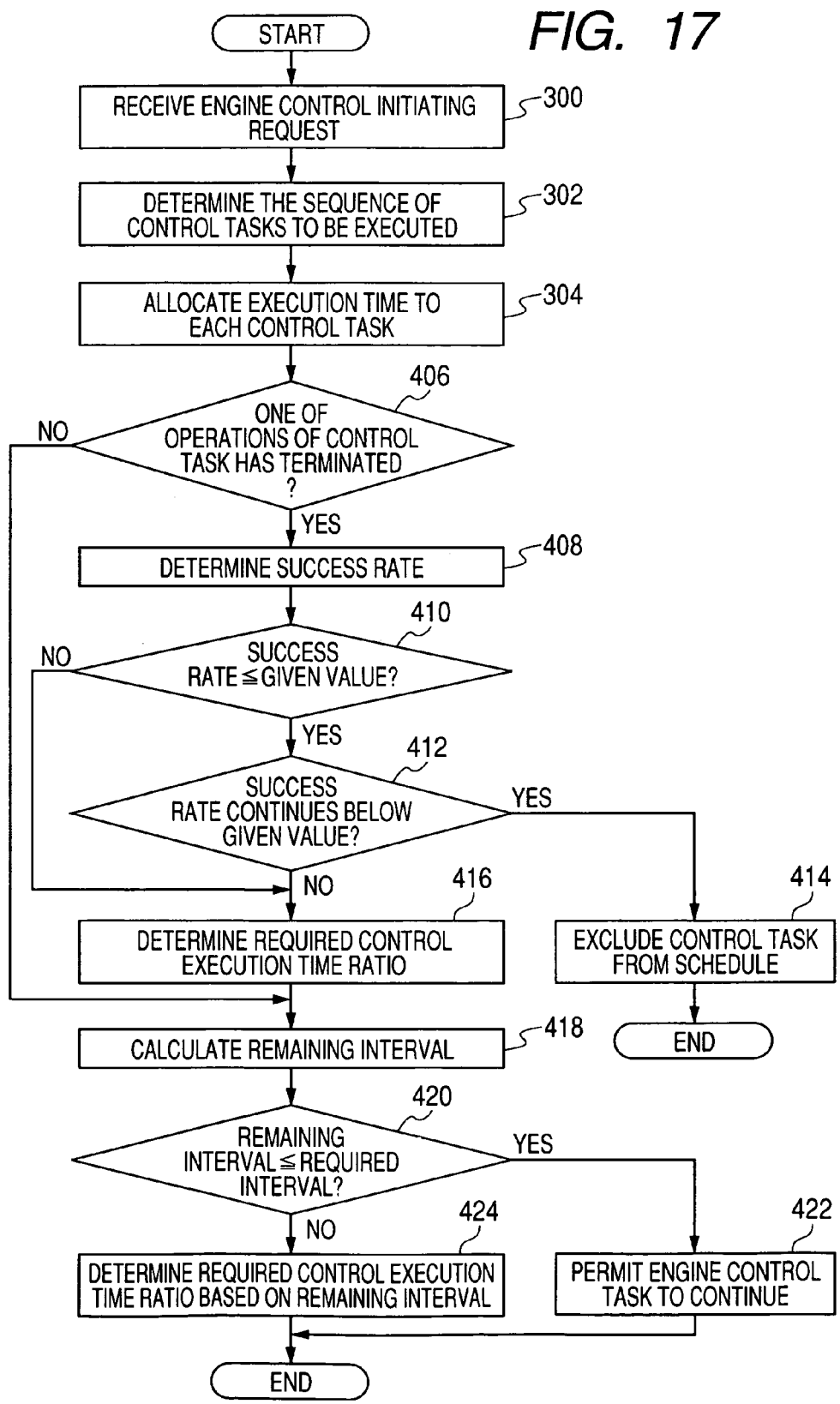

ENGINE CONTROL SYSTEM DESIGNED TO MANAGE SCHEDULE OF ENGINE CONTROL TASKS

CROSS REFERENCE TO RELATED DOCUMENT

The present application claims the benefit of Japanese Patent Application Nos. 2007-247399 flied on Sep. 25, 2007 and 2007-247398 filed on Sep. 25, 2007, the disclosure of which is incorporated herein by reference.

BACKGROUND OF THE INVENTION

1. Technical Field of the Invention

The present invention relates generally to an engine control system which may be employed in automotive vehicles and is designed to manage the schedule of execution of a sequence of engine control tasks.

2. Background Art

There are known schedule management systems which work to manage the schedule of a sequence of engine control tasks to control an operating condition of an automotive internal combustion engine. When receiving a request to execute a second one of the engine control tasks during execution of a first one of the engine control tasks, the system defers the execution of the second engine control task so as not to interfere with that of the first engine control task.

For instance, when a small quantity fuel injection learning task, as taught in Japanese Patent First Publication No. 2005-155360, is being executed as one of the engine control tasks when an internal combustion engine is decelerating, and no fuel is being injected into the engine, the system needs to defer the execution of the other engine control tasks until completion of the small quantity fuel injection learning task. The small quantity fuel injection learning task is to instruct a fuel injectors to spray a small quantity of fuel into the engine and calculate an actually sprayed quantity of the fuel to learn an injection characteristic of the fuel injector.

The execution of one of the engine control tasks to which an execution condition provides a higher priority to initiate or which is greater in required control execution time ratio, as will be described later in detail, prior to the other engine control tasks will, however, result in decreased chances to process the other engine control tasks.

Particularly, when the engine is decelerating, and no fuel is being sprayed into the engine, disturbances are usually small, so that lots of requests are made to commence the small quantity fuel injection learning task or the other engine control tasks, the system needs to defer the execution of the second or following engine control tasks until completion of the first one, thus limiting the chances of processing them.

When the schedule of execution of the engine control tasks which are requested to start is fixed, it may result in a difficulty in rescheduling the engine control tasks in view of the status of execution thereof for a subsequent execution cycle.

SUMMARY OF THE INVENTION

It is therefore a principal object of the invention to avoid the disadvantages of the prior art.

It is another object of the invention to provide an engine control system designed to manage a schedule of engine control tasks so as to provide chances of execution of the engine control task as evenly as possible.

According to one aspect of the invention, there is provided an engine control system which may be employed in automotive vehicles. The engine control system is designed to manage a schedule of execution of engine control tasks and comprises: (a) request receiving means for receiving requests to initiate engine control tasks; and (b) scheduling means for scheduling execution of the engine control tasks. When the request receiving means receives the request, the scheduling means determines a sequence of execution of at least two of the engine control tasks which are requested to be initiated and allocating execution times for which the at least two of the engine control tasks are to be executed.

In the preferred mode of the invention, the scheduling means may determine the sequence of execution of all the engine control tasks requested to be initiated and allocates the discrete execution times to all the engine control tasks.

The scheduling means determines the sequence of execution so that one of the engine control tasks which is smaller in required control execution time ratio is executed prior to that which is greater in required control execution time ratio.

The scheduling means may delimit the execution times within a constant reference time frame and allows the at least two of the engine control tasks to be executed in a cycle in a unit of the reference time frame.

The scheduling means may delimit each of the execution times within the reference time frame as a function of a corresponding one of required control execution time ratios of the engine control tasks.

Each of the execution times may be determined in a unit of a travel distance of a vehicle equipped with the engine control system.

In the case where the last least two of the engine control tasks may be allowed to be processed simultaneously, the scheduling means determines the sequence of execution so that the last least two of the engine control tasks are executed in parallel to each other.

At least one of the engine control tasks is to operate an actuator. When the actuator is being operated during execution of the one of the engine control tasks, the scheduling means defers execution of the other of the engine control tasks.

According to the second aspect of the invention, there is provided an engine control system for managing a schedule of execution of engine control tasks. The engine control system comprises: (a) request receiving means for receiving requests to initiate engine control tasks; (b) scheduling means for scheduling execution of the engine control tasks, the scheduling means determining a sequence of ones of the engine control tasks which are requested to be initiated based on required control execution time ratios thereof and allocating execution times for which the ones of the engine control tasks are to be executed; and (c) frequency determining means for determining the required control execution time ratios based on statuses of execution of the ones of the engine control tasks.

In the preferred mode of the invention, the scheduling means may increase the execution time of each of the ones of the engine control tasks as the required control execution time ratio is greater.

The frequency determining means may increase the required control execution time ratio of each of the ones of the engine control tasks as a degree of importance thereof is higher.

The statuses of execution of the ones of the engine control tasks may be degrees of success of the execution thereof. In this case, the frequency determining means increases the required control execution time ratio of each of the ones of the engine control tasks as the degree of success thereof is lower.

When the degree of success of one of the ones of the engine control tasks continues to be lower than a given value, the scheduling means may exclude the one of the engine control tasks from a schedule of execution of the ones of the engine control tasks.

The statuses of execution of the ones of the engine control tasks may be intervals remaining until the ones of the engine control tasks are to be stopped, respectively. In this case, the frequency determining means increases the required control execution time ratio of each of the ones of the engine control tasks as the remaining interval thereof becomes small.

The scheduling means may permit one of the ones of the engine control tasks which has decreased in the remaining interval than a given value to continue to be executed in priority to the other engine control tasks.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 3(a) is a view which shows the third example of management of a schedule of execution of engine control tasks;

FIG. 3(b) is a view which shows the fourth example of management of a schedule of execution of engine control tasks;

FIG. 4(a) is a view which shows the fifth example of management of a schedule of execution of engine control tasks;

FIG. 4(b) is a view which shows the sixth example of management of a schedule of execution of engine control tasks;

FIG. 5(a) is a view which shows the seventh example of management of a schedule of execution of engine control tasks;

FIG. 5(b) is a view which shows the eighth example of management of a schedule of execution of engine control tasks;

FIG. 17 is a flowchart of a schedule management program to be executed in the second embodiment of the invention.

DESCRIPTION OF THE PREFERRED EMBODIMENTS

Figures 1, 2A, 2B:
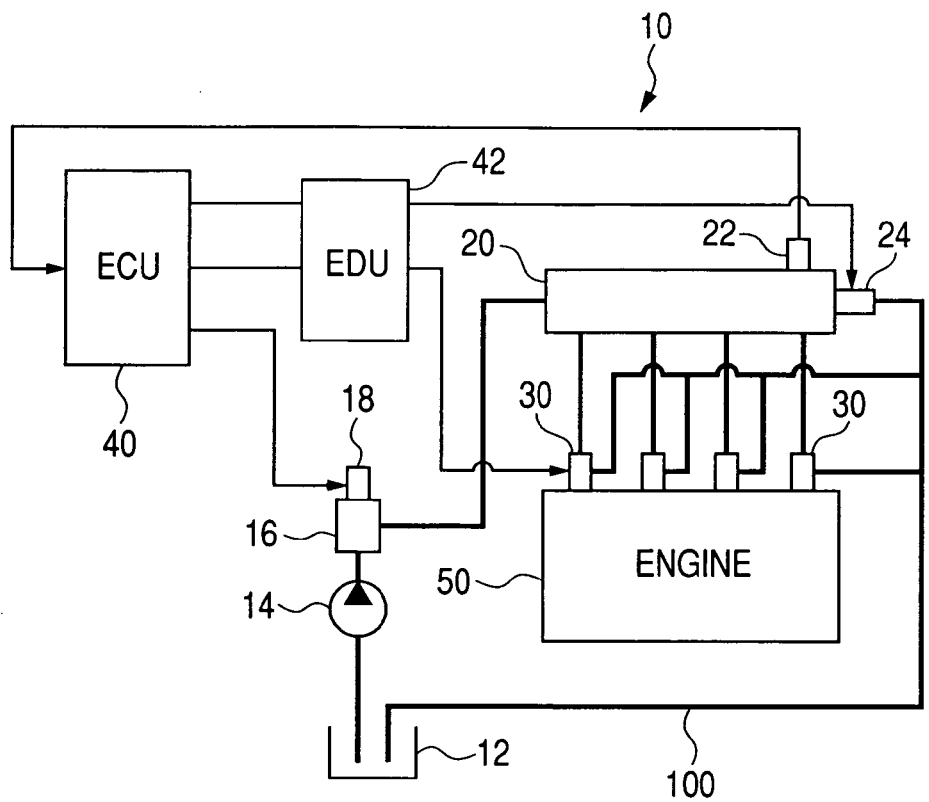
FIG. 1 is a block diagram which illustrates an engine control system according to the invention.
FIG. 2(a) is a view which shows the first example of management of a schedule of execution of engine control tasks.
FIG. 2(b) is a view which shows the second example of management of a schedule of execution of engine control tasks.

Referring to the drawings, particularly to FIG. 1, there is shown an accumulator fuel injection system 10 according to the invention.

The accumulator furl injection system 10 consists essentially of a feed pump 14, a high-pressure pump 16, a common rail 20, a pressure sensor 22, a pressure-reducing valve 24, fuel injectors 30, an electronic control unit (ECU) 40 and an electronic driving unit (EDU) 42. The accumulator fuel injection system 10, as referred to herein, is designed to supply fuel into each cylinder of, for example, an automotive four-cylinder diesel engine 50. For the sake of convenience, FIG. 1 illustrates only one signal line extending from the EDU 42 to one of the fuel injectors 30.

The feed pump 14 works to pump the fuel out of a fuel tank 12 and feed it to the high-pressure pump 16. The high-pressure pump 16 is of a typical structure in which a plunger is reciprocated following rotation of a cam of a camshaft of the diesel engine 50 to pressurize the fuel sucked into a pressure chamber thereof. The high-pressure pump 16 is equipped with a suction control valve 18.

The suction control valve is disposed in a fuel path extending between an fuel inlet and the pressure chamber of the high-pressure pump 16. The suction control valve 18 is a solenoid-operated valve which works to change an open area in the fuel path through which the fuel flows into the pressure chamber as a function of a value of current supplied thereto. The ECU 40 controls the duty cycle of the current to be supplied to the suction control valve 18 to regulate the flow rate of fuel to be sucked from the feed pump 14 into the high-pressure pump 16 when the plunger of the high-pressure pump 16 is in a suction stroke.

The common rail 20 works as a fuel accumulator which stores therein the fuel fed from the high-pressure pump 16 and keeps it at a pressure selected based on an operating conditions of the diesel engine 50. The pressure of fuel in the common rail 20 (which will also be referred to as a common rail pressure below) is controlled by a balance between the amount of fuel fed by the high-pressure pump 16 and that drained by the pressure-reducing valve 24. The pressure sensor 22 measures the common rail pressure and output a signal indicative thereof to the ECU 40.

When opened, the pressure-reducing valve 24 drains the fuel out of the common rail 20 into a return pipe 100 to reduce the pressure in the common rail 20. The pressure-reducing valve 24 may be implemented by a typical solenoid valve equipped with a spring, a valve member, and a coil. The spring urges the valve member to a closed position at an times. When energized, the coil produces a magnetic attraction to lift the valve member up to an open position to drain the fuel out of the common rail 20. An on-duration for which the pressure-reducing valve 24 is kept opened is controlled by the width of a pulse current supplied to the coil thereof. The greater the width of the pulse current, the longer the on-duration.

The fuel injectors 30 are installed one in each of the cylinders of the diesel engine 40. Each of the fuel injectors 30 works to spray the fuel stored in the common rail 20 into one of the cylinders of the diesel engine 50. Each of the fuel injectors 30 is controlled in operation by the EDU 42 to perform a sequence of multiple injections of fuel such as the pilot injection, the main injection, and the post injection in every engine operating cycle (i.e., a four-stroke cycle) including intake or induction, compression, combustion, and exhaust. Each of the fuel injectors 30 is a typical solenoid-operated valve in which the pressure of fuel in a control chamber is regulated by the EDU 42 to move a nozzle needle to control the quantity of fuel to be sprayed into the diesel engine 50.

The ECU 40 is implemented by a typical microcomputer made up of a CPU, a ROM, a RAM, and a non-volatile memory such as an EEPROM. The ECU 50 samples outputs from an accelerator position sensor (not shown) working to measure the position ACC of an accelerator pedal (i.e., an open position of a throttle valve), a temperature sensor (not shown), the pressure sensor 22, a speed sensor NE (not shown) working to measure the speed of the diesel engine 50, an oxygen ($O_2$) sensor (not shown) working to measure is the concentration of oxygen in exhaust emission of the diesel engine 50, a differential pressure sensor (not shown) working to measure a differential pressure of a DPF (Diesel Particulate Filter not shown), etc. to determine an operating condition of the diesel engine 50. The ECU 40 controls the energization of the suction control valve 18, the pressure-reducing valve 24, and the fuel injectors 30 to bring the operating condition of the diesel engine 50 to a desired state.

When the diesel engine 50 is decelerating, and no fuel is being sprayed into the diesel engine 50, the ECU 40 works to perform engine control tasks: a small quantity fuel injection learning task, output error learning tasks to learn errors in outputs of the oxygen sensor and the speed sensor NE, a PM (Particulate Matter) deposit measuring task to measure the amount of deposit of the PM in the DPF using an output of the differential pressure sensor, and a sticking check task to check the sticking of an EGR (Exhaust Gas Recirculation) valve.

The ECU 40 stores in the ROM or the EEPROM a discharge characteristic map which represents a relation between the duty cycle of the pulse current to drive the suction control valve 18 and the amount of fuel to be discharged by the high-pressure pump 16. The ECU 40 monitors the pressure in the common rail 20, as measured by the pressure sensor 22, and controls the energization of the suction control valve 18 by look-up using the discharge characteristic map so as to bring the pressure in the common rail 20 into agreement with a target level in a feedback control mode.

The ECU 40 also works to monitor the engine operating conditions derived, as described above, using the outputs from the pressure sensor 22, etc. to control the injection timing and injection duration for each of the fuel injectors 30. Specifically, the ECU 40 outputs an injection control signal in the form of a pulse (will also be referred to an injection pulse signal below) to the EDU 42 to instruct one of the fuel injectors 30 to spray a target quantity of fuel at a selected injection timing. The ECU 40 stores therein an injection quantity-to-pulse width map which lists relations between the pulse width of the injection pulse signal and the quantity of fuel to be sprayed from the fuel injectors 30, one for each of predefined levels of the pressure of fuel in the common rail 20.

The EDU 42 is responsive to control signals outputted from the ECU 40 to produce a drive current or a drive voltage to be supplied to the pressure-reducing valve 24 and the fuel injectors 30.

The ECU 40 executes a sequence of logical steps or program, as will be discussed later in detail, stored in the ROM or the EEPROM and is designed to perform following functions.

1 Request Receiving Function

The ECU 40 receives engine control initiating requests to initiate the engine control tasks for controlling the diesel engine 50 and/or peripheral devices required to run or keep the diesel engine 50 in a desired condition, 2 Scheduling Function The ECU 40 schedules the engine control tasks, that is, determines the order or sequence of the engine control tasks to be executed and also assign or allocate execution times, one to each of the engine control tasks.

Usually, the diesel engine 50 and moving parts of the peripheral devices (e.g., the fuel injectors 30) deteriorate with an increase in travel distance of an automotive vehicle (will also be referred to as a system vehicle below) in which the diesel engine 50 is mounted. The ECU 40 works to determine the execution times, as expressed in a unit of a travel distance of the system vehicle, and allocate them to the engine control tasks, respectively, to ensure the reliability in controlling the operating condition of the diesel engine 50. The ECU 40 may alternatively define each of the execution times on a time basis.

The execution time allocated to each of the engine control tasks is not always a time frame long enough to complete it fully. The ECU 40, as will be described later in detail, delimits the execution time regardless of the length of time required to complete each of the engine control tasks fully. Therefore, if one of the engine control tasks is not completed within the allocated execution time in the first execution cycle, it will be resumed when the execution time allocated in the subsequent execution cycle is reached.

The ECU 40 determines the sequence of the engine control tasks to be initiated and processed and allocates the execution times to them, respectively, so as to prevent one of the engine control tasks which are required to be processed from fully occupying the time needed to be shared with the other engine control tasks. This establishes chances to execute the engine control tasks evenly which are required to be processed.

The management of scheduling of the engine control tasks will be described below taking as an example control tasks A, B, and C. It is assumed in this example that the control task A is required to have the execution time delimited and allocated at a required time-sharing ratio (will also be referred to as a required control execution time ratio below) of five (5), the control tasks B is required to have the execution time allocated at a required control execution time ratio of three (3), and the control task C is required to have the execution time allocated at a required control execution time ratio of two (2). The required control execution time ratio is a ratio of the execution times among the control tasks A, B, and C, in other words, a ratio of a total time frame allocated to the control tasks A, B, and C to be shared among the control tasks A, B, and C.

How to allocate the execution times to the engine control tasks is classified into two types: within-reference time-scheduling to define or delimit the execution times within a constant reference time and allocate them to the control tasks A, B, and C and fixed time-scheduling to allocate a fixed time to each of the control tasks A, B, and C as the execution time.

The reference time, as used in the within-reference time-scheduling, is constant regardless of the number of the engine control tasks requested to be executed. In other word, a total time in which a sequence of selected ones of the engine control tasks are to be executed is fixed. This scheduling is easy to manage. Note that the total time is also defined on a travel distance basis, but may be defined on a time basis.

The execution times allocated one to each of the engine control tasks are fixed regardless of the number of the engine control tasks requested to be executed. This scheduling facilitates ease of allocation of the execution times to the engine control tasks.

2-1 Within-Reference Time-Scheduling

FIG. 2(a) demonstrates the allocation of the same time frames as the execution times to the control tasks A and B required to be executed. FIG. 2(b) demonstrates the allocation of the same time frames to the control tasks A, B, and C. Specifically, the length of the time frame assigned to each of the engine control tasks is, therefore, changed depending upon the number of the engine control tasks required to be executed.

FIG. 3(a) demonstrates the allocation of different time frames to the control tasks A and B required to be executed. Similarly, FIG. 3(b) demonstrates the allocation of different time frames to the control tasks A, B, and C. Specifically, the length of each of the time frames is determined based on the required control execution time ratio of a corresponding one of the engine control tasks. The greater the required control execution time ratio of the engine control task, the longer the execution time therefor. This causes one of the engine control tasks which is great in the required control execution time ratio to be completed early and also permits it to be completed an increased number of times.

FIG. 4(a) demonstrates, like in FIG. 3(a), the allocation of different time frames to the control tasks A and B required to be executed. Similarly, FIG. 4(b) demonstrates the allocation of different time frames to the control tasks A, B, and C. The length of each of the time frames is set longer as the required control execution ratio of a corresponding one of the engine control tasks to be executed increases. This causes one of the engine control tasks which is high in the required control execution time ratio to be completed early and also permits it to be completed an increased number of times.

In the examples of FIGS. 4(a) and 4(b), one of the engine control tasks which is smaller in the required control execution time ratio is performed prior to that which is greater in the required control execution time ratio, thereby ensuring the completion of the engine control task which is smaller in the required control execution time ratio even if the travel distance by which the system vehicle travels one time is shorter than the reference time, so that it is difficult to complete all ones of the engine control tasks required to be executed during traveling of the system vehicle.

2-2 Fixed Time-Scheduling

FIG. 5(a) demonstrates the allocation of the same time frames as the execution times to the control tasks A and B required to be executed regardless of the required control execution time ratios of the control tasks A and B. This facilitates the ease of allocation of the execution times to the engine control tasks. Similarly, FIG. 5(b) demonstrates the allocation of the same time frames to the control tasks A, B, and C.

Figure 6A:
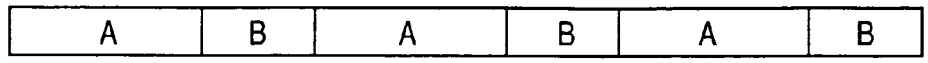
FIG. 6(a) is a view which shows the ninth example of management of a schedule of execution of engine control tasks.
Figure 6B:
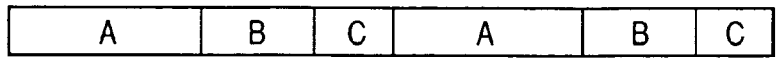
FIG. 6(b) is a view which shows the tenth example of management of a schedule of execution of engine control tasks.

FIG. 6(a) demonstrates the allocation of different fixed time frames to the control tasks A and B required to be executed. Similarly, FIG. 6(b) demonstrates the allocation of different fixed time frames to the control tasks A, B, and C. Each of the time frames is selected fixedly as a function of the required control execution time ratio of a corresponding one of the engine control tasks. This causes one of the engine control tasks which is greater in the required control execution time ratio to be completed early and also permits it to be completed an increased number of times.

Figure 7A:
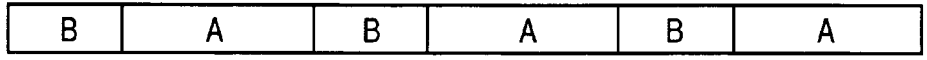
FIG. 7(a) is a view which shows the eleventh example of management of a schedule of execution of engine control tasks.

FIG. 7(a) demonstrates, like in FIG. 6(a), the allocation of different fixed time frames to the control tasks A and B required to be executed. Similarly, FIG. 7(b) demonstrates the allocation of different fixed time frames to the control tasks A, B, and C. The length of each of the time frames is set as a function of the required control execution time ratio of a corresponding one of the engine control tasks to be executed. This causes one of the engine control tasks which is greater in the required control execution time ratio to be completed early and also permits it to be completed an increased number of times.

Figure 7B:
FIG. 7(b) is a view which shows the twelfth example of management of a schedule of execution of engine control tasks.

In the examples of FIGS. 7(a) and 7(b), one of the engine control tasks which is smaller in the required control execution time ratio is performed prior to that which is greater in the required execution time ratio, thereby ensuring the completion of the engine control task which is smaller in the required control execution time ratio even if the travel distance by which the system vehicle travels one time is short, so that it is difficult to complete all ones of the engine control tasks required to be executed during traveling of the system vehicle.

2-3 Interrupt Request Scheduling

Figure 8:
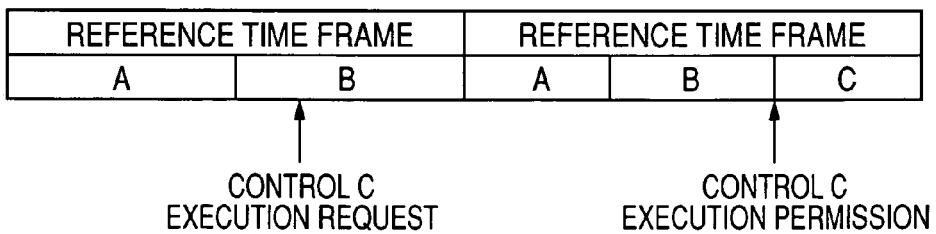
FIG. 8 is a view which shows the thirteenth example of management of a schedule of execution of engine control tasks when a request to execute an engine control task C is made during execution of an engine control task B.

When a request to initiate the control task C is, as illustrated in FIG. 8, made during execution of the control task B, that is, within the execution time allocated to the control task B, the ECU 40 does not allocate the execution time to the control task C within the reference time in this execution cycle, but reschedules the execution of a sequence of the control tasks A, X, and C for the subsequent execution cycle. Specifically, the ECU 40 permits the control task C to be executed within the reference time in the subsequent execution cycle.

2-4 Execution Time Cut/Rescheduling

Figure 9:
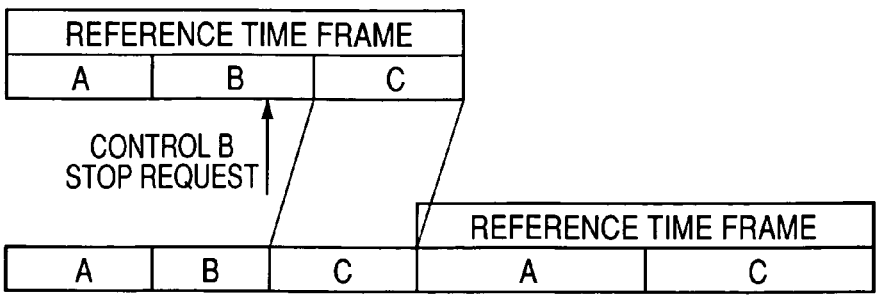
FIG. 9 is a view which shows the fourteenth example of management of a schedule of execution of engine control tasks when a request to terminate an engine control task B is made during execution of the engine control task B.

When the control task B has terminated, as illustrated in FIG. 9, that is, a request to stop the control task B has been made before the execution time allocated thereto expires, the ECU 40 immediately permits the control task C to be executed. In other words, upon termination of the control task B, the ECU 40 immediately reschedules the execution time in which the control task C is to be executed within the reference time in this execution cycle. This minimizes a total time consumed in executing the engine control tasks.

If a request to terminate the control task B is made at the time when the control task B is not being executed, the ECU 40 sets the execution time which has already been allocated to the control task B to zero (0) and reschedules the execution of the control task A and/or C.

2-5 Parallel Scheduling

The above examples in the within-reference time-scheduling and the fixed time-scheduling have referred to the sequential execution of the engine control tasks. Usually, the engine control tasks are broken down into two types: one must be executed exclusively, and the other may be executed in parallel.

For instance, the small quantity fuel injection learning task must be executed exclusively when the diesel engine 50 is decelerating, and no fuel is being sprayed into the diesel engine 50. The small quantity fuel injection learning task is to instruct a selected one of the fuel injectors 30 to spray a small quantity of fuel into the diesel engine 50 in a cycle and calculate actually sprayed quantities of the fuel to learn an injection characteristic of the fuel injector. When it is required to initiate the small quantity fuel injection learning task, the ECU 40 controls the high-pressure pump 16 to regulate the pressure in the common rail 20 to a desired level and instructs a selected one of the fuel injectors 30 to spray a target quantity of fuel into the diesel engine 50.

The output error learning tasks to learn errors in outputs of the oxygen sensor and the speed sensor NA are allowed to be executed in parallel to each other when the diesel engine 50 is decelerating, and no fuel is being sprayed into the diesel engine 50. The output error learning task for the oxygen sensor is to measure the concentration of oxygen ($O_2$) contained in exhaust gas which is emitted from the diesel engine 50 when no fuel is being sprayed into the diesel engine 50 and which substantially corresponds to the atmosphere to calculate a deviation of the output of the oxygen sensor from the concentration of oxygen in the atmosphere. The output error learning task for the speed sensor NE is to sample pulses outputted sequentially from the speed sensor ME to measure speeds of pistons in cylinders of the diesel engine 50 when there is usually no variation in burning of the fuel among the cylinders and to calculate a variation in the speed of the pistons to determine an error in the output of the speed sensor NE.

The small quantity fuel injection learning task and the output error learning tasks should not be executed simultaneously.

Figure 10:
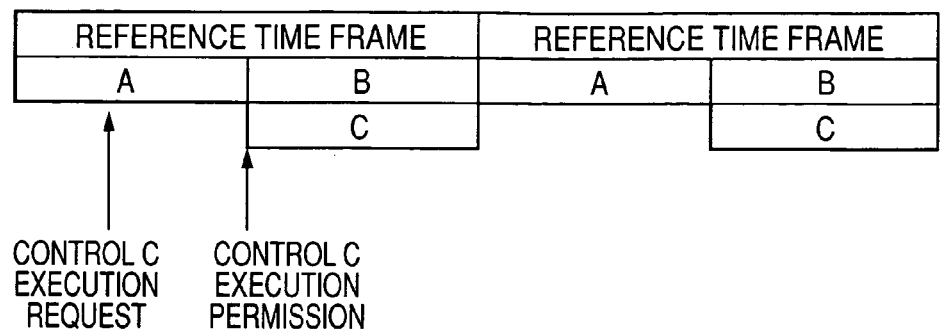
FIG. 10 is a view which shows the fifteenth example of management of a schedule of execution of engine control tasks when a request to execute an engine control task C is made which is permitted to be processed in parallel to an engine control task B.

When it is required, as illustrated in FIG. 10, to commence the small quantity fuel injection learning task (i.e., the control task A), the output error learning task for the oxygen sensor (i.e., the control task B), and the output error learning task for the speed sensor NE (i.e., the control task q, the ECU 40 schedules the control tasks B and C so that they will be executed in parallel to each other. This results in a decrease in total time required to complete selected one of the control tasks as compared with the sequential execution of the control tasks.

Figure 11:
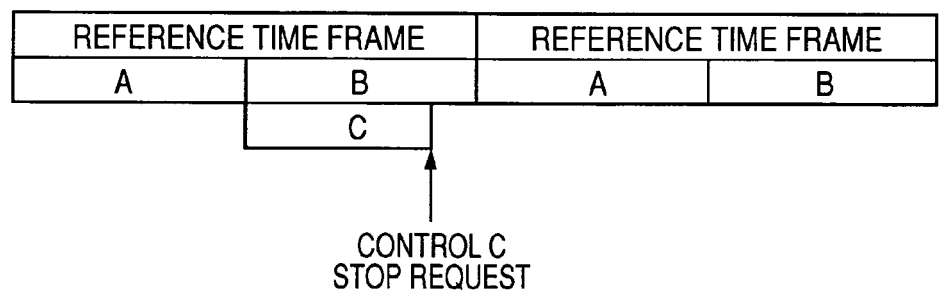
FIG. 11 is a view which shows the sixteenth example of management of a schedule of execution of engine control tasks when a request to terminate an engine control task C is made during execution of the engine control task C in parallel to an engine control task B.

When the control task C, as illustrated in FIG. 11, which has been executed along with the control task B terminates, that is, a request to terminate the control task C is made before the execution time allocated thereto expires, the ECU 40 immediately erases the execution time for the control task C while maintaining the schedule of the execution times for the control tasks A and B as it is.

2-6 Masking Scheduling

There are some of the engine control tasks which should be executed only in an exclusive engine control mode to operate an actuators) such as the EGR valve, the high-pressure pump 16, or the fuel injectors 30. If the actuator which is operating in the exclusive engine control mode is stopped because the execution time thereof expires, the exclusive engine control mode is released to commence the other engine control task(s), after which it is required to resume the exclusive engine control mode, it will cause the time to be consumed undesirably in placing the actuator in a condition required by the exclusive engine control mode. The conditions of the diesel engine 50 when the actuator has been halted may also not match those required to initiate the other engine control task(s).

Figure 12:
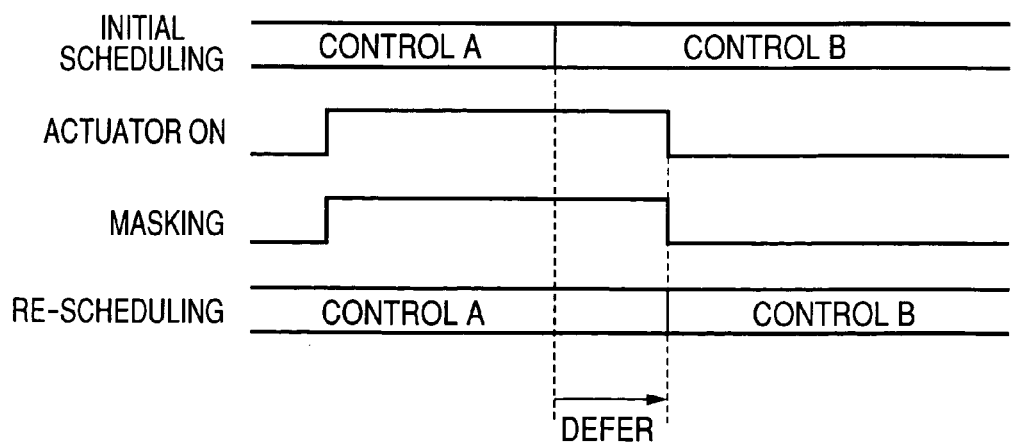
FIG. 12 is a view which shows re-scheduling of engine control task when an actuator is operating.

In order to alleviate the above disadvantages, the ECU 40 works to, as illustrated in FIG. 12, mask or cancel the execution time for the control task B after the expiry of the execution time for the control task A to continue the control task A until the actuator is stopped properly. Specifically, after the actuator is stopped properly in the control task A, the ECU 40 reschedules the execution of the control task B. This enhances the efficiency in executing the control task A and also matches the conditions of the diesel engine 50 when the actuator has been halted with those required to initiate the control task B.

Schedule Management

Figure 13:
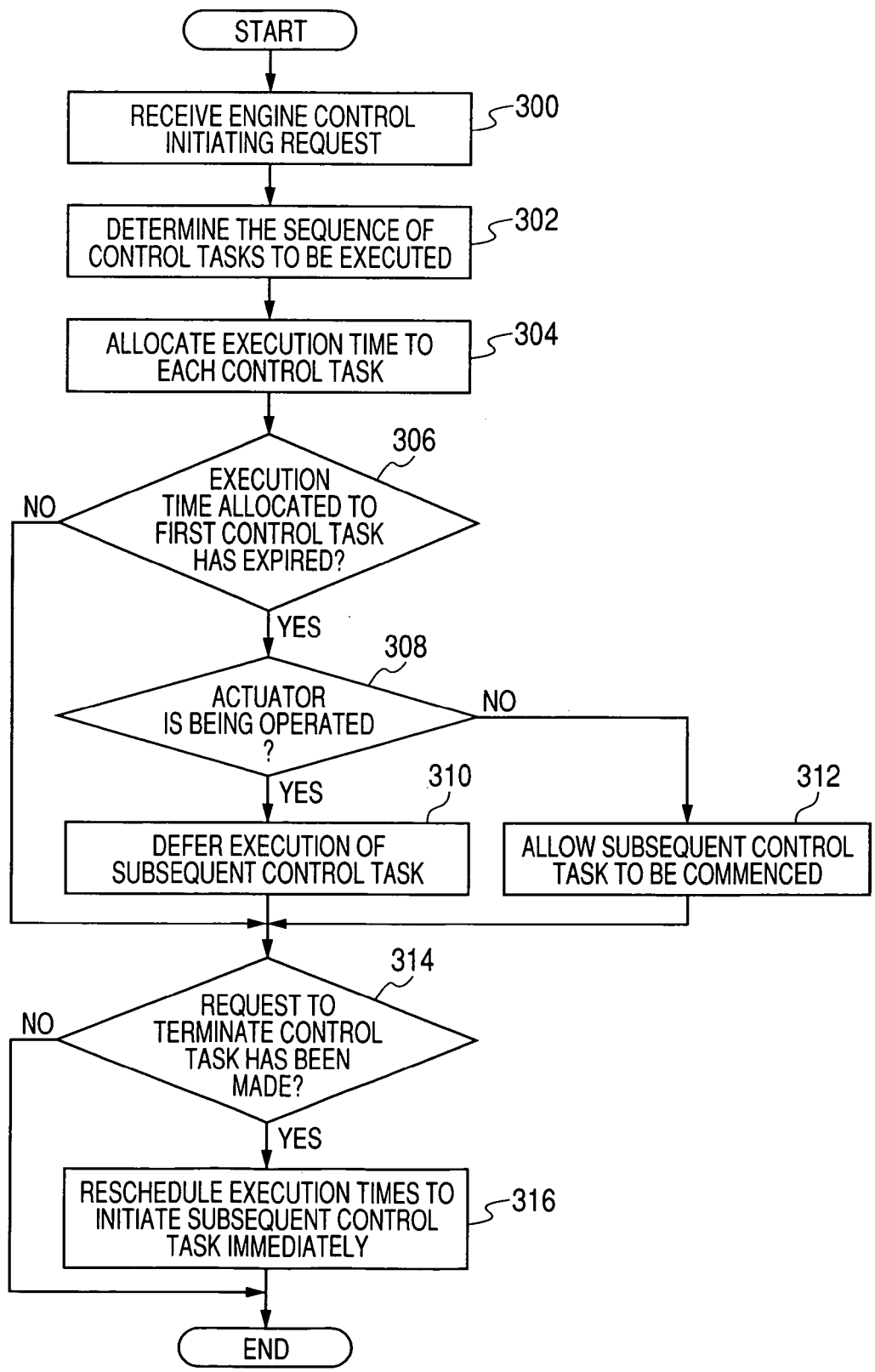
FIG. 13 is a flowchart of a schedule management program to be executed in the first embodiment of the invention.

FIG. 13 shows an engine control tasks schedule management program to be executed by the ECU 40 in a cycle at all times.

After entering the program, the routine proceeds to step 300 wherein the engine control initiating requests to initiate the engine control tasks are received.

The routine proceeds to step 302 wherein ones of the engine control tasks required to be executed are analyzed to determine whether they are allowed to be executed in parallel to one another or should each be executed inclusively, and the sequence of the ones of the engine control tasks to be processed is determined in the manner, as described above.

The routine proceeds to step 304 wherein the execution time is allocated in the manner, as descried above, to each of the engine control tasks required to be processed, and the engine control tasks are initiated.

The routine proceeds to step 306 wherein it is determined whether the execution time, as allocated to a first one of the engine control tasks now being executed, has expired or not. If a NO answer is obtained, then the routine proceeds to step 314.

Alternatively, if a YES answer is obtained in step 306, then the routine proceeds to step 308 wherein it is determined whether the first one of the engine control tasks is flow operating the actuator, as described above, or not. If a YES answer is obtained, then the routine proceeds to step 310 wherein the execution time, as allocated to one of the engine control tasks scheduled to be initiated subsequently, is masked to prohibit the engine control task from being initiated immediately.

Alternatively, if a NO answer is obtained in step 308 meaning the actuator is not operated during the execution of the first engine control task, then the routine proceeds to step 312 wherein the one of the engine control tasks scheduled to be initiated subsequently is allowed to be initiated.

After step 310 or 312, or if a NO answer is obtained in step 306, the routine proceeds to step 314 wherein it is determined whether the engine control task now being executed has submitted a request to be terminated itself or not. If a NO answer is obtained, then the routine terminates. Alternatively, if a YES answer is obtained, then the routine proceeds to step 316 wherein the execution times in which the other engine control tasks are to be executed are rescheduled to initiate a subsequent one of the engine control tasks immediately.

The ECU 40 of the second embodiment of the invention will be described below.

The ECU 40 is designed to perform following functions.

1 Request Receiving Function

The ECU 40, like in the first embodiment, receives engine control initiating requests to initiate the engine control tasks to control the diesel engine 50 and/or the peripheral devices.

2 Scheduling Function

The ECU 40, like in the first embodiment, schedules the sequence of the engine control tasks to be executed and also allocate the execution time to each of the engine control tasks.

The ECU 40 determines the execution times, as expressed in a unit of a travel distance of the system vehicle, as a function of the degree of the deterioration of the diesel engine 50 and the peripheral devices thereof and allocates them to the engine control tasks, respectively, to ensure the reliability in controlling the operating condition of the diesel engine 50. The ECU 40 may alternatively define, like in the first embodiment, each of the execution times on a time basis.

The execution time allocated to each of the engine control tasks is, like in the first embodiment, not always a time frame long enough to complete it fully. The ECU 40, as will be described later in detail, delimits the execution time regardless of the length of time required for completing each of the engine control tasks. Therefore, if one of the engine control tasks is not completed within the allocated execution time, it will be resumed when the execution time allocated in the subsequent execution cycle is reached.

The ECU 40 determines the order of the engine control tasks to be initiated and processed and allocates the execution times to them, respectively, thus preventing one of the engine control tasks which are required to be processed from fully occupying the time frame needed to be shared with the other engine control tasks. This establishes chances of executing all the engine control tasks required to be executed.

It is advisable to increase the execution time to be allocated to one of the engine control tasks which is higher in required control execution time ratio thereof. In the case where the same time frames are allocated to the engine control tasks as the execution times, the engine control tasks may be scheduled so that one of them which is greater in required control execution time ratio will be processed prior to the other engine control tasks, thereby causing one of the engine control tasks which is greater in the required control execution time ratio to be completed early and also permitting it to be completed an increased number of times.

The ECU 40 may determine the required control execution time ratio of each of the engine control tasks variably based on the status thereof being executed, as will be described later. Specifically, the ECU 40 may monitor the status of the engine control task now being executed and schedule the next execution thereof.

Figure 14:
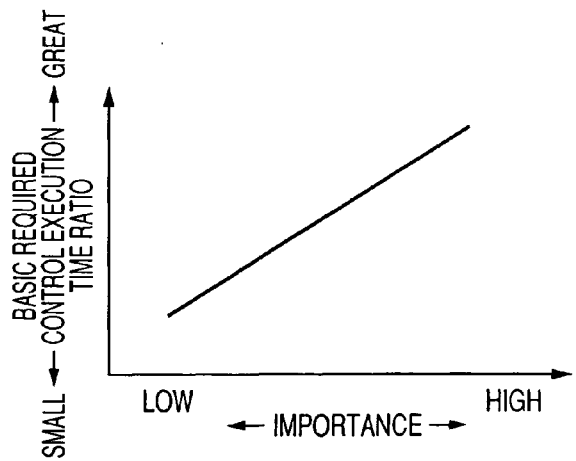
FIG. 14 is a view which shows a relation between the degree of importance of an engine control task and a basic required control execution time ratio of the engine control task.

The ECU 40, as illustrated in FIG. 14, works to increase the required control execution time ratio of each of the engine control tasks with an increase in significance or the degree of importance thereof, thereby completing one of the engine control tasks which is higher in the level of importance early and allowing it to be completed an increased number of times. The ECU 40 may have a map representing the relation in FIG. 14 to determine the required control execution time ratio of each of the engine control tasks based on the level of importance thereof.

3 Frequency Determining Function 3-1 Success Rate

The engine control tasks do not always succeed. Tanking an example, the small quantity fuel injection learning task that is one of the engine control tasks is made up of for example, ten injection quantity sampling operations each of which is to instruct a selected one of the fuel injectors 30 to spray a small quantity of fuel into the diesel engine 50 and sample the quantity of the fuel actually sprayed from the fuel injector 30. When the ten injection quantity sampling operations have all terminated, and ten data on the actually sprayed quantity of fuel have been sampled, the ECU 40 analyzes the ten data to learn the injection characteristic of the fuel injector 30. For instance, the ECU 40 calculates a deviation of an average of the actually sprayed quantities of fuel from a target quantity of fuel the fuel injector 30 has been instructed to spray and determines the injection characteristic of the fuel injector 30 based on the deviation. For example, when one of the actually sprayed quantities of fuel deviates greatly from a reference value, the ECU 40 determines that a corresponding one of the injection quantity sampling operations has failed. When a variation in the actually sprayed quantity of fuel is great, the ECU 40 determines that it is difficult to calculate the average of the actually sprayed quantities correctly and cancels the collected data on the actually sprayed quantities of fuel.

Figure 15:
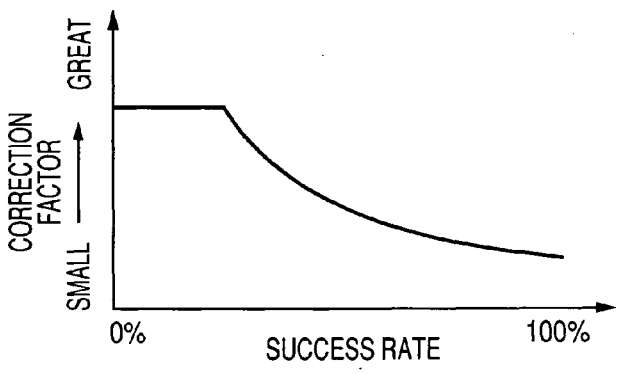
FIG. 15 is a view which shows a success rate of an engine control task and a correction factor to correct a required control execution time ratio of the engine control task.

If such a failure has occurred in the engine control task, it will virtually result in a decrease in the required control execution time ratio of the engine control task. The ECU 40 is, therefore, designed to, as illustrated in FIG. 15, increase a correction factor which corrects the required control execution time ratio of one of the engine control tasks when the success rate of the one of the engine control tasks has decreased. Specifically, the ECU 40 increases the correction factor to increase the required control execution time ratio of the engine control tasks. For instance, when one of the engine control tasks has be completed properly and fully, the ECU 40 determines the success rate to be 100% and sets the correction factor to one (1) to keep the required control execution time ratio as it is.

The increase in the required control execution time ratio of the engine control task which is lower in success rate will result in an increase in chance to execute it.

The ECU 40 stores therein expected success values each of which represents a total number of times operations making up one of the engine control tasks succeed in sequence in units of a travel distance of the system vehicle. When the number of times the operations have been completed correctly has reached the expected succeed value within a reference time frame, the ECU 40 determines that the success rate of the engine control task is 100%. The success rate of each of the engine control tasks is given by an equation (1) below.

$$\text{Success Rate} = (\text{number of actual successes/execution permission travel distance})/(\text{reference number of successes/reference travel distance}) \quad (1)$$

where "number of actual success" indicates the number of times the operations of one of the engine control task has been completed successfully, which is notified to the ECU 40 from the engine control task, "execution permission travel distance" indicates a total travel distance of the system vehicle for which the engine control task has been allowed to be processed actually, "reference number of successes" indicates the expected success value, and "reference travel distance" indicates a predetermined travel distance of the system vehicle for which the number of times the operations of one of the engine control tasks are completed successfully is to reach the expected succeed value (i.e., the reference number of successes).

When the number of sampled results of the operations of the engine control task is small, it will result in a decrease in level of reliability in calculating the success rate. It is, thus, advisable to calculate the success rate of each of the engine control tasks after the number of sampled results of the operations thereof reaches a given value. The ECU 40 determines the time when the success rate is to start to be calculated according to an equation (2) below.

$$\text{Calculation start time} = (\text{reference travel distance}/\text{reference number of successes}) \times \text{set value} \quad (2)$$

When the execution condition to initiate each of the engine control tasks is unstable, so that the number of executions of the operations of the engine control task within the reference travel distance is expected to vary between execution cycles of the engine control task, the ECU 40 may increase the set value.

When the success rate has decreased below a given value, it is, as illustrated in FIG. 15, preferable to keep the correction factor constant which corrects the required control execution time ratio of the engine control task. This is because when the required control execution time ratio of the engine control task which is lower in the success rate is increased excessively, it will disturb the execution of the other engine control tasks.

When the success rate continues to be lower than a given value, the ECU 40 concludes that the possibility of full success of a corresponding one of the engine control tasks in this execution cycle is low and may exclude it from the schedule of execution of the engine control tasks. The given value may be identical with or different from that used to keep the correction factor constant. The ECU 40 may reschedule the engine control task which has once been excluded from the schedule upon reception of a re-request of execution therefrom.

When the success rate continues to be lower than the given value, the ECU 40 may alternatively prohibit the required control execution time ratio of a corresponding one of the engine control tasks from being corrected as a function of the success rate without excluding the one of the engine control tasks from the schedule of execution and use a predetermined reference required control execution time ratio instead.

3-2 Remaining Interval

Figure 16A:
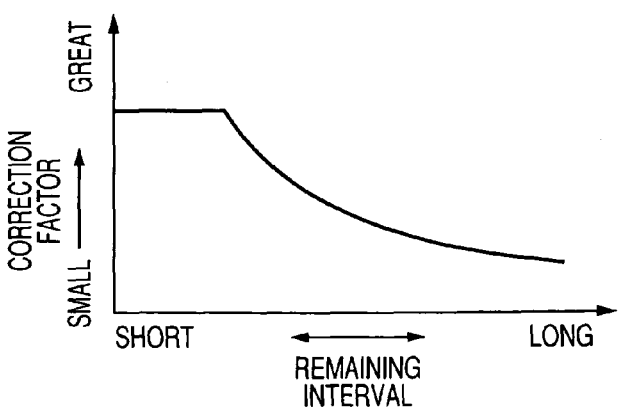
FIG. 16(a) is a view which shows a remaining interval of an engine control task and a correction factor to correct a required control execution time ratio of the engine control task.
Figure 16B:
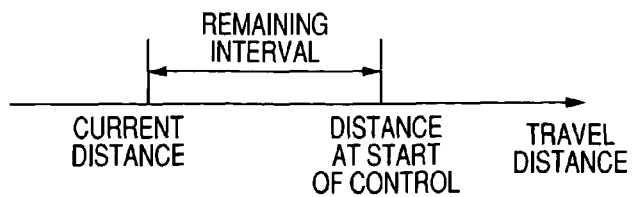
FIG. 16(b) is a view which shows how to determine a remaining interval of an engine control task.

The ECU 40 determines the time limit at which each of the engine control tasks is to be stopped. For instance, when it is required to execute a sequence of the engine control tasks in a cycle of a predetermined travel distance (e.g., 100 km) of the system vehicle, one of the engine control tasks must always be stopped until the start of the subsequent execution cycle in which the one of the engine control tasks is to be executed. Due to the aging of a controlled objects(s) such as the fuel injectors 30, the engine control task may alternatively need to be stopped until the system vehicle reaches a decreased travel distance. It is, therefore, advisable to, as illustrated in FIG. 16(*a*), increase the required control execution time ratio of the engine control tasks which are smaller in remaining interval, as defined below. The increasing of the required control execution time ratio is achieved by increasing the correction factor, thereby causing the engine control tasks which are smaller in the remaining interval to be completed fully and early.

The remaining interval, as referred to herein, is an interval, as illustrated in FIG. 16(*b*), between the current travel distance of the system vehicle (i.e., the current moment when a sequence of the engine control tasks starts) and a travel distance of the system vehicle at which the next execution cycle of the sequence of the engine control tasks (i.e., the start of the sequence of the engine control tasks in the subsequent execution cycle) is to be initiated. For instance, in the case where a sequence of the control tasks A, B, and C is to be processed in the first execution cycle, the remaining interval of the control task B is an interval between the start of first execution cycle and the start of a second or following execution cycle in which the control task B is to be executed first. The remaining interval is expressed by an equation (3) below.

$$\text{Remaining interval} = \text{travel distance at which next sequence of engine control tasks is to start} - \text{current travel distance} \quad (3)$$

The ECU 40 compares the remaining interval with a time frame required for completing a corresponding one of the engine control tasks fully to modify the schedule of the one of the engine control tasks.

Specifically, when the remaining interval of one of a sequence of the engine control tasks is greater than the required time frame, however, it is getting shorter every execution of the sequence of the engine control tasks, the ECU 40, as illustrated in FIG. 16(*a*), increases the correction factor to increase the required control execution time ratio of the one of the engine control tasks. This avoids the delay of completion of the one of the engine control tasks.

However, when the remaining interval of one of a sequence of the engine control tasks has become shorter than a given value, as illustrated in FIG. 16(*a*), it is advisable to keep the correction factor constant in order to alleviate the disadvantage that an excessive increase in the required control execution time ratio of the one of the engine control tasks disturbs the execution of the other engine control tasks.

When the remaining interval of one of a sequence of the engine control tasks is smaller than or equal to the required time frame, the ECU 40 cancels the current schedule of the one of the engine control tasks and reschedules it so as to start earlier in the subsequent execution cycle or permits it to continue over the previously scheduled execution time as long as possible, in other words, permits the one of the engine control tasks to continue to be executed in priority to the other engine control tasks.

Schedule Management

FIG. 17 shows an engine control tasks schedule management program to be executed by the ECU 40 in a cycle at all times.

After entering the program, the routine proceeds to step 300 wherein the engine control initiating requests to initiate the engine control tasks are received.

The routine proceeds to step 302 wherein ones of the engine control tasks requested to be executed are analyzed to determine whether they are allowed to be executed in parallel to one another or should each be executed inclusively, and the sequence of the ones of the engine control tasks to be processed is determined in the manner, as described above.

The routine proceeds to step 304 wherein the execution time is allocated in the manner, as descried above, to each of the engine control tasks required to be processed, and the engine control tasks are initiated. The execution time of one of the engine control tasks which is greater in required control execution time ratio is longer than that which is smaller in required control execution time ratio. In the case where the execution times allocated to the engine control tasks are equal in length to each other, the schedule of the engine control tasks may be determined so that one of the engine control tasks which is greater in required control execution time ratio is initiated prior to that which is smaller in required control execution time ratio.

The routine proceeds to step 406 wherein it is determined whether one of operations of one of the engine control tasks which is now being executed has been completed or not. Tanking an example, the small quantity fuel injection learning task is made up of, for example, ten injection quantity sampling operations each of which is to instruct a selected one of the fuel injectors 30 to spray a small quantity of fuel into the diesel engine 50 and sample the quantity of the fuel actually sprayed from the fuel injector 30. When the ten injection quantity sampling operations have all terminated, and ten data on the actually sprayed quantity of fuel have been sampled, the ECU 40 analyzes the ten data to learn the injection characteristic of the fuel injector 30. For instance, the ECU 40 calculates a deviation of an average of the actually sprayed quantities of fuel from a target quantity of fuel the fuel injector 30 has been instructed to spray and determines the injection characteristic of the fuel injector 30 based on the deviation.

If a YES answer is obtained in step 406, then the routine proceeds to step 408 wherein the success rate of the one of the engine control tasks is determined according to Eq. (1), as described above.

The routine then proceeds to step 410 wherein it is determined whether the success rate is smaller than a given value or not if a YES answer is obtained, then the routine proceeds to step 412 wherein it is determined whether the event in which the success rate is smaller than the given value has continued over a given number of cycle of step 410 or not.

If a YES answer is obtained in step 412, the ECU 40 determines that the possibility of full success of the engine control task now being processed in this execution cycle is low. The routine then proceeds to step 414 wherein the engine control task now being processed is excluded from the schedule of execution of the engine control tasks. The routine then terminates. Upon initiation of a next one of the engine control tasks, the routine starts from step 406.

If a NO answer is obtained in step 410 or step 412, then the routine proceeds to step 416 wherein the required control execution time ratio of the engine control task is determined based on the success rate calculated in step 408 in the manner, as described above.

If a NO answer is obtained in step 406 or after step 416, the routine proceeds to step 418 wherein the remaining interval of the engine control task is calculated according to Eq. (3), as described above.

The routine proceeds to step 420 wherein it is determined whether the remaining interval is smaller than or equal to the required time frame, as described above, or not. If a YES answer is obtained, then the routine proceeds to step 422 wherein the schedule, as derived in step 302 and 304, is cancelled to permit the engine control task now being processed to continue in prior to the other engine control tasks, as described above.

Alternatively, if a NO answer is obtained in step 420, then the routine proceeds to step 424 wherein the required control execution time ratio of the engine control task is determined based on the remaining interval. The routine then terminates. Upon initiation of a next one of the engine control tasks, the routine starts from step 406.

As apparent from the above discussion, the ECU 40 of the second embodiment works to determine the sequence of the engine control tasks based on the required control execution time ratios thereof and allocate the discrete execution times to the engine control tasks, respectively, thereby eliminating the need for deferring the execution of ones of the engine control tasks until completion of the preceding one and sharing chances of allowing the engine control tasks to be executed as equally as possible among them.

The ECU 40 determines the required control execution time ratio of each of the engine control tasks based on the status of execution thereof, thus permitting the engine control tasks to be rescheduled in view of the status of execution thereof for the subsequent execution cycle.

The ECU 40 may be modified as discussed below.

The ECU 40 allocates, as descried above, the discrete execution times to all the engine control tasks required to be executed, respectively. However, in the case where there is one of the engine control tasks which is preferably completed in a single execution cycle, the ECU 40 may work to allocate an execution time that is long enough to complete that engine control task.

The ECU 40 determines, as described above, the execution times on a basis of a travel distance of the system vehicle, but may alternatively do it in a unit of a running time of the diesel engine 50. In the case where it is required to schedule the execution times for the engine control tasks which are to be processed when a no fuel-spraying/deceleration condition in which no fuel is being sprayed, and the diesel engine 50 is decelerating is encountered, the ECU 40 may determine the execution times in a unit of the number of times the system vehicle has been placed in the no fuel-spraying/deceleration condition or in a unit of time.

The fuel injection system 10 may also be used with gasoline engines, hybrid engines made up of an internal combustion engine and an electric motor, or electric motors which are mounted in, for example, automotive vehicles.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

What is claimed is:

1. An engine control system for managing a schedule of execution of engine control tasks comprising:
   request receiving means for receiving requests to initiate engine control tasks; and
   scheduling means for scheduling execution of the engine control tasks, when said request receiving means receives the requests, said scheduling means determining a sequence of execution of all the engine control tasks which are requested to be initiated and allocating execution times for which the engine control tasks requested to be initiated are to be executed within a constant reference time frame, said scheduling means performing the execution of the engine control tasks cyclically and altering lengths of the allocated execution times, within the constant reference time frame, depending upon a number of the engine control tasks requested to be initiated.

2. An engine control system as set forth in claim 1, wherein said scheduling means determines a sequence of execution of all the engine control tasks requested to be initiated and allocates discrete execution times to all the engine control tasks.

3. An engine control system as set forth in claim 1, wherein said scheduling means determines the sequence of execution so that one of the engine control tasks which is smaller in required control execution time ratio is executed prior to that which is greater in required control execution time ratio.

4. An engine control system as set forth in claim 1, wherein said scheduling means delimits the execution times within the constant reference time frame and allows the engine control tasks to be executed in a cycle in a unit of the reference time frame.

5. An engine control system as set forth in claim 4, wherein said scheduling means delimits each of the execution times within the reference time frame as a function of a corresponding one of required control execution time ratios of the engine control tasks.

6. An engine control system as set forth in claim 1, wherein each of the execution times is determined in a unit of a travel distance of a vehicle equipped with the engine control system.

7. An engine control system as set forth in claim 1, wherein when two of the engine control tasks are allowed to be processed simultaneously, said scheduling means determines the sequence of execution so that the two of the engine control tasks are executed in parallel to each other.

8. An engine control system as set forth in claim 1, wherein at least one of the engine control tasks is to operate an actuator, and wherein when the actuator is being operated during execution of the one of the engine control tasks, said scheduling means defers execution of the other of the engine control tasks.

9. An engine control system for managing a schedule of execution of engine control tasks comprising:
request receiving means for receiving requests to initiate engine control tasks;
scheduling means for scheduling execution of the engine control tasks, said scheduling means determining a sequence of ones of the engine control tasks which are requested to be initiated based on required control execution time ratios thereof and allocating execution times for which the ones of the engine control tasks are to be executed; and
frequency determining means for determining the required control execution time ratios based on statuses of execution of the ones of the engine control tasks.

10. An engine control system as set forth in claim 9, wherein said scheduling means increases the execution time of each of the ones of the engine control tasks as the required control execution time ratio is greater.

11. An engine control system as set forth in claim 9, wherein said frequency determining means increases the required control execution time ratio of each of the ones of the engine control tasks as a degree of importance thereof is higher.

12. An engine control system as set forth in claim 9, wherein the statuses of execution of the ones of the engine control tasks are degrees of success of the execution thereof, and wherein said frequency determining means increases the required control execution time ratio of each of the ones of the engine control tasks as the degree of success thereof is lower.

13. An engine control system as set forth in claim 12, wherein when the degree of success of one of the ones of the engine control tasks continues to be lower than a given value, said scheduling means excludes the one of the engine control tasks from a schedule of execution of the ones of the engine control tasks.

14. An engine control system as set forth in claim 9, wherein the statuses of execution of the ones of the engine control tasks are intervals remaining until the ones of the engine control tasks are to be stopped, respectively, and wherein said frequency determining means increases the required control execution time ratio of each of the ones of the engine control tasks as the remaining interval thereof becomes small.

15. An engine control system as set forth in claim 14, wherein said scheduling means permits one of the ones of the engine control tasks which has decreased in the remaining interval than a given value to continue to be executed in priority to the other engine control tasks.

16. A method of managing a schedule of execution of engine control tasks, the method comprising:
receiving requests to initiate engine control tasks;
scheduling execution of the engine control tasks, said scheduling including determining a sequence of ones of the engine control tasks which are requested to be initiated based on required control execution time ratios thereof and allocating execution times for which the ones of the engine control tasks are to be executed; and
determining the required control execution time ratios based on statuses of execution of the ones of the engine control tasks.

17. The method as set forth in claim 16, wherein said scheduling includes increasing the execution time of each of the ones of the engine control tasks as the required control execution time ratio is greater.

18. The method as set forth in claim 16, wherein said determining includes increasing the required control execution time ratio of each of the ones of the engine control tasks as a degree of importance thereof is higher.

19. The method as set forth in claim 16, wherein the statuses of execution of the ones of the engine control tasks are degrees of success of the execution thereof, and wherein said determining includes increasing the required control execution time ratio of each of the ones of the engine control tasks as the degree of success thereof is lower.

20. The method as set forth in claim 16, wherein the statuses of execution of the ones of the engine control tasks are intervals remaining until the ones of the engine control tasks are to be stopped, respectively, and wherein said determining includes increasing the required control execution time ratio of each of the ones of the engine control tasks as the remaining interval thereof becomes small.

21. A method of managing a schedule of execution of engine control tasks, the method comprising:
receiving requests to initiate engine control tasks; and
scheduling execution of the engine control tasks, when the requests are received, said scheduling including determining a sequence of execution of all the engine control tasks which are requested to be initiated and allocating execution times for which the engine control tasks requested to be initiated are to be executed within a constant reference time frame, and
performing the execution of the engine control tasks cyclically and altering lengths of the allocated execution times, within the constant reference time frame, depending upon a number of the engine control tasks requested to be initiated.

22. The method as set forth in claim 21, wherein said scheduling includes determining a sequence of execution of all the engine control tasks requested to be initiated and allocates discrete execution times to all the engine control tasks.

23. The method as set forth in claim 21, wherein said scheduling means determines the sequence of execution so that one of the engine control tasks which is smaller in required control execution time ratio is executed prior to that which is greater in required control execution time ratio.

24. The method as set forth in claim 21, wherein said scheduling means delimits the execution times within the constant reference time frame and allows the engine control tasks to be executed in a cycle in a unit of the reference time frame.

25. The method as set forth in claim 21, wherein each of the execution times is determined in a unit of a travel distance of a vehicle equipped with the engine control system.

26. The method as set forth in claim 21, wherein when two of the engine control tasks are allowed to be processed simultaneously, said scheduling means determines the sequence of execution so that the two of the engine control tasks are executed in parallel to each other.

27. The method as set forth in claim 21, wherein at least one of the engine control tasks is to operate an actuator, and wherein when the actuator is being operated during execution of the one of the engine control tasks, said scheduling means defers execution of the other of the engine control tasks.

* * * * *